US007014153B2

(12) United States Patent
Helot et al.

(10) Patent No.: US 7,014,153 B2
(45) Date of Patent: Mar. 21, 2006

(54) CABLE-SECURING DEVICE

(75) Inventors: Jacques H Helot, San Cugat del Valles (ES); Olivier Mache, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/419,162

(22) Filed: Apr. 21, 2003

(65) Prior Publication Data

US 2004/0011928 A1  Jan. 22, 2004

(30) Foreign Application Priority Data

Apr. 23, 2002  (EP) .................... 02354069

(51) Int. Cl.
*F16L 3/22* (2006.01)
(52) U.S. Cl. .................... 248/68.1; 248/74.1
(58) Field of Classification Search .......... 248/49, 248/68.1, 65, 67.7, 74.1, 74.2, 71
See application file for complete search history.

(56) References Cited

U.S. PATENT DOCUMENTS

| 3,079,781 | A | * | 3/1963 | Virtanen ..................... 431/138 |
| 3,154,275 | A | * | 10/1964 | Stewart ........................ 248/65 |
| 3,990,454 | A | * | 11/1976 | Schlesinger ................. 604/180 |
| 5,147,093 | A | * | 9/1992 | Tisdale ....................... 273/156 |
| 5,209,441 | A | * | 5/1993 | Satoh ......................... 248/74.2 |
| 5,868,362 | A | * | 2/1999 | Daoud .......................... 248/71 |
| 5,950,648 | A | * | 9/1999 | Skrocki et al. .............. 134/201 |
| 6,441,093 | B1 | * | 8/2002 | Tominaga et al. ........... 525/191 |
| 6,631,876 | B1 | * | 10/2003 | Phillips ..................... 248/74.2 |

FOREIGN PATENT DOCUMENTS

| GB | 2138911 A | * 10/1984 |
| WO | WO 01/45222 | 6/2001 |

OTHER PUBLICATIONS

Patent Abstracts of Japan vol. 1995. No. 09, Oct. 21,1995 & JP 07 147720 A (Sumitomo Wiring Syst Ltd), Jun. 6, 1995 *abstract*.

* cited by examiner

*Primary Examiner*—Ramon O Ramirez
(74) *Attorney, Agent, or Firm*—Foley & Lardner LLP

(57) ABSTRACT

A device includes an attachment means adapted to be attached to a mounting point, and a cable enclosure mounted on the attachment means. The enclosure adapted so that one or more cables can be removably constrained therein. In one embodiment, the cable enclosure is formed in the shape of a resilient flat washer having a substantially radial cut or split thereby allowing the washer to deform in a direction substantially perpendicular to the plane of the washer while being rigid in a direction in the plane of the washer thereby allowing cables to be inserted or removed from within the washer when the washer is twisted and the split opened, but constraining the cables within the washer when the washer is flat and the split is closed.

11 Claims, 2 Drawing Sheets

CABLE-SECURING DEVICE

TECHNICAL FIELD

The present invention relates to methods and apparatus for securing, locating and organising cables. More particularly, although not exclusively, the present invention relates to methods and apparatus for retaining loose cables in such a way as to collect them into a bundle and secure the bundle to a fixed or selected mounting point. In particular, the invention relates to a cable-securing device particularly suitable for organising cables connecting computer peripherals. However, it is understood that the invention may find application to other situations where cables or wires are to be tidied or otherwise arranged.

BACKGROUND ART

Many cable-securing systems and devices are known. These can be as simple as flexible tie-type devices which are twisted around a cable bundle so as to secure or collect them together. More complex methods involve purpose-manufactured devices which can be used to mount cables or cable bundles on a support surface or structure.

A common requirement of most cable-securing systems is that they should be able to easily allow the addition and removal of cables such that they can be secured easily and quickly. This is desirable as it is often the case that a cable bundle may need to be dismantled to allow reconfiguration of the interconnected devices or the addition of new cables in the bundle. It is also necessary that any cable-securing system be inexpensive to manufacture as well as simple and robust in design.

There are many industrial cabling applications in which the present invention may be useful. However, one of the more useful purposes to which it may be applied is in organising the cabling or wiring connecting a personal computer (PC) and its peripherals. Peripheral cabling problems have been worsened by the introduction and growth of USB technology which produced a situation where even relatively modest personal computers have expansion capabilities which can allow the connection of a very large number of peripherals. Apart from the usual monitor, keyboard, mouse and printer, it is common to connect additional devices such as PDA docking stations, digital media interfaces, speakers, modems, gaming input devices and network connections. Even where a USB hub is used, this results in a mess of cables.

This problem is of course also apparent in a business environment where workstations, docking stations and the like are connected to network hubs, and I/O devices. Of course workstations and PCs also include a power input cable and, where the monitor is not powered from the PSU, a power cable supplying the monitor.

The resulting mass of cables is almost always unsightly and may also present a risk in terms of accidental disconnection during maintenance where the wrong cable might be traced and disconnected.

In the context of PCs and similar types of hardware, a number of solutions have been proposed to address this issue. However, not all of them are ideal.

It is possible to secure cables in a bundle using plastic self-locking strap devices. These devices incorporate a ratchet mechanism at one end of the strap and an engagement surface along part of the other end. The cable mass is bundled together and the device wrapped around it. The engagement end is inserted into the ratchet and drawn tight. While being a cheap and effective means of bundling cables, it is very difficult to add or remove cables without destroying the strap. In fact, it is common to cut the strap to perform this action. These devices are generally very good for organising cable or wire masses inside workstations or PCs. However, they are quite impractical for cable organisation outside a machine. Cables bundled outside a PC are more likely to be reconfigured and unless spare securing straps are on hand, it is likely that the cable mass will be left in disarray.

Another solution is to add a cable-cover or shroud over the part of the PC which incorporates the I/O ports, usually on the back of the machine. These devices can be retrofitted and serve to conceal the cable mass from view. However, they only function around the area directly at the rear of the machine. Also, maintaining a PC having such a device can be awkward, as the shroud must be removed whenever a cable is to be connected or disconnected from the machine.

It is also common for a cable mass to extend for some distance between a PC and its peripherals, mains power supply or network connection. In these situations it is possible to use some type of conduit material to constrain the cables. Examples of this include spiral tubing which wraps around the cables. However, this material can be awkward to use, as it may be difficult to disentangle a cable from the spiral tubing and from the other cables in the bundle.

Thus the problem reduces to how to organise the cables in a neat and tidy manner, while allowing for the easy and fast removal/addition of selected cables from/to the cable bundle. The solution ideally should be inexpensive and preferably the securing means is in one part. This latter point is important as wherever a securing system requires more than one part for assembly, there is an almost certain probability that parts will be lost, mislaid, or simply not easily at hand when configuring a cable mass.

The object of the present invention is therefore to overcome or at least ameliorate some of the abovementioned disadvantages, while providing a solution that is simple, easy to manufacture and very easy to use. It is also desirable that the invention be flexible to the extent that it can be used not only to organise a cable bundle, but also to secure a cable bundle to a mounting point.

DISCLOSURE OF THE INVENTION

In one aspect, the invention provides for a cable-securing device including an attachment means adapted to be attached to a mounting point, and a cable enclosure mounted on the attachment means, the enclosure adapted so that one or more cables can be removably constrained therein.

The cable enclosure is preferably formed in the shape of a resilient flat washer having a substantially radial cut or split thereby allowing the washer to deform in a direction substantially perpendicular to the plane of the washer while being rigid in a direction in the plane of the washer. This allows cables to be inserted or removed from within the washer when the washer is twisted and the split opened, but constrains the cables within the washer when the washer is flat and the split is closed.

The attachment means is preferably resilient and in the form of a clip having an open jaw section shaped and dimensioned so that it can be engaged with a suitably shaped mounting point by means of a snap action.

Preferably the clip is shaped so that it can resiliently engage with an elongate part of a mounting means.

The clip is preferably shaped and dimensioned so as to engage by a snap fit with the mounting point.

Preferably the clip is in the shape of a hollow cylinder having a lengthwise portion removed to form an open jaw section thereby allowing the clip to be engaged with a similarly shaped mounting means section.

In a preferred embodiment the cable enclosure is mounted on the cylindrical ring clip so that the one or more cables constrained within the enclosure are aligned substantially parallel with the lengthwise axis of the ring clip.

In one embodiment, the clip may be adapted so that it can engage with a flexible power supply cable in a resilient snap action.

In a preferred embodiment, the ring clip may be adapted so that it engages with a rigid mounting means.

In an alternative embodiment, the attachment point may be in the form of a flat or otherwise shaped part adapted for gluing to a flat surface, a flat part incorporating screw holes for mounting to a corresponding surface, a snap plug adapted to engage with a hole in a mounting surface or another engagement means adapted to be engaged with a correspondingly shaped mounting means.

In yet a further aspect, the invention provides for a cable gathering device preferably formed in the shape of a resilient flat washer having a substantially radial cut or split thereby allowing the washer to deform in a direction substantially perpendicular to the plane of the washer while being rigid in a direction in the plane of the washer.

This allows cables to be inserted or removed from within the washer when the washer is twisted and the split opened, but constrains the cables within the washer when the washer is flat and the split is closed.

Other shapes of washer may be used, such as square, triangular or other irregular or regular shape.

BRIEF DESCRIPTION OF THE DRAWINGS

The present invention will now be described by way of example only and with reference to the drawings in which.

BEST MODE FOR CARRYING OUT THE INVENTION

Figure 1:
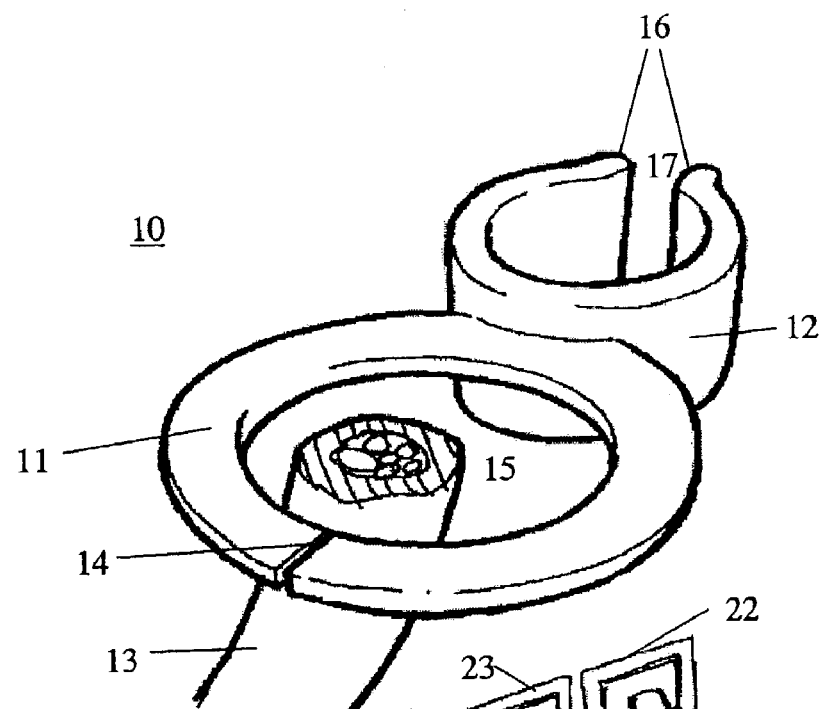
FIG. 1: illustrates an embodiment of a cable-securing device engaging a cable.
Figure 2:
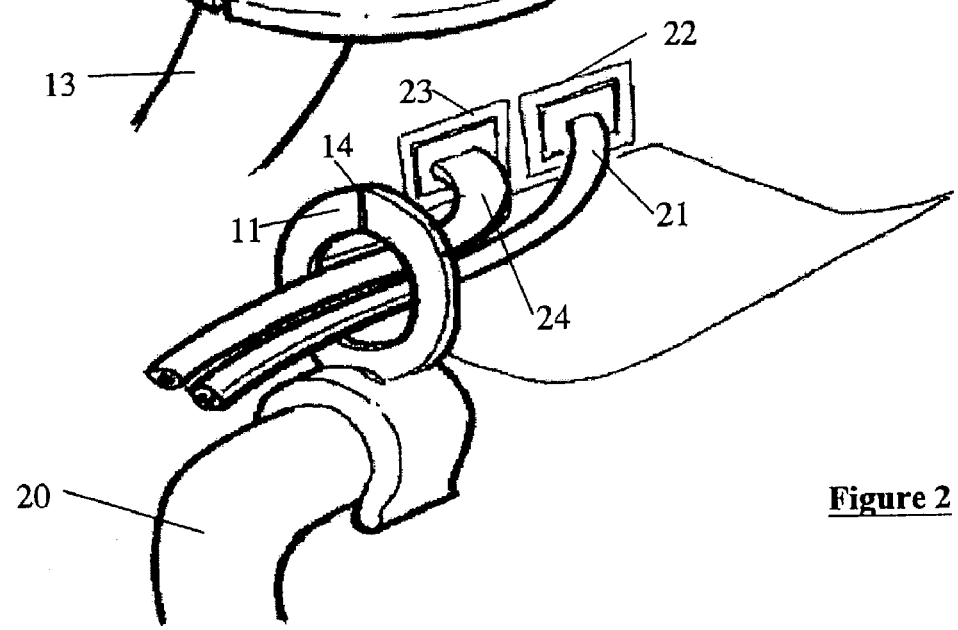
FIG. 2: illustrates a cable-securing device mounted on a rigid mounting means and engaging two cables.

FIG. 1 shows an embodiment of the present invention. In this exemplary embodiment, the invention provides a cable-securing device 10. The device includes an attachment means 12 adapted to be attached to a mounting point (20 in FIG. 2). A cable enclosure 11 is mounted on the attachment means 12. The enclosure is shaped so that one or more cables 13 can be removably constrained therein.

In the preferred example described herein, the cable enclosure 11 is formed in the shape of a resilient flat washer having a substantially radial cut or split 14. The split 14 allows the washer to deform or twist in a direction substantially perpendicular to the plane of the washer (direction A in FIG. 3) while retaining its rigidity in the plane of the washer (direction B in FIG. 3).

This allows cables to be easily and rapidly inserted or removed from within the washer when the washer is twisted and the split opened. However, when the washer is flat (see FIG. 3, lower drawing) the cables are constrained within the washer.

The shape of the washer resists lateral movement as the width and resilience of the flat portions is high compared to the resilience of the flat portions when twisted. Thus the device is particularly resistant to opening in the direction show by the letter B and the split remains closed. The feature whereby the split is substantially resistant to opening in one direction while being easily opened in another provides a particularly useful property in that the expected displacement direction for the enclosed cables is approximately in the same direction as the that provides the most opening-resistance.

Figure 3:
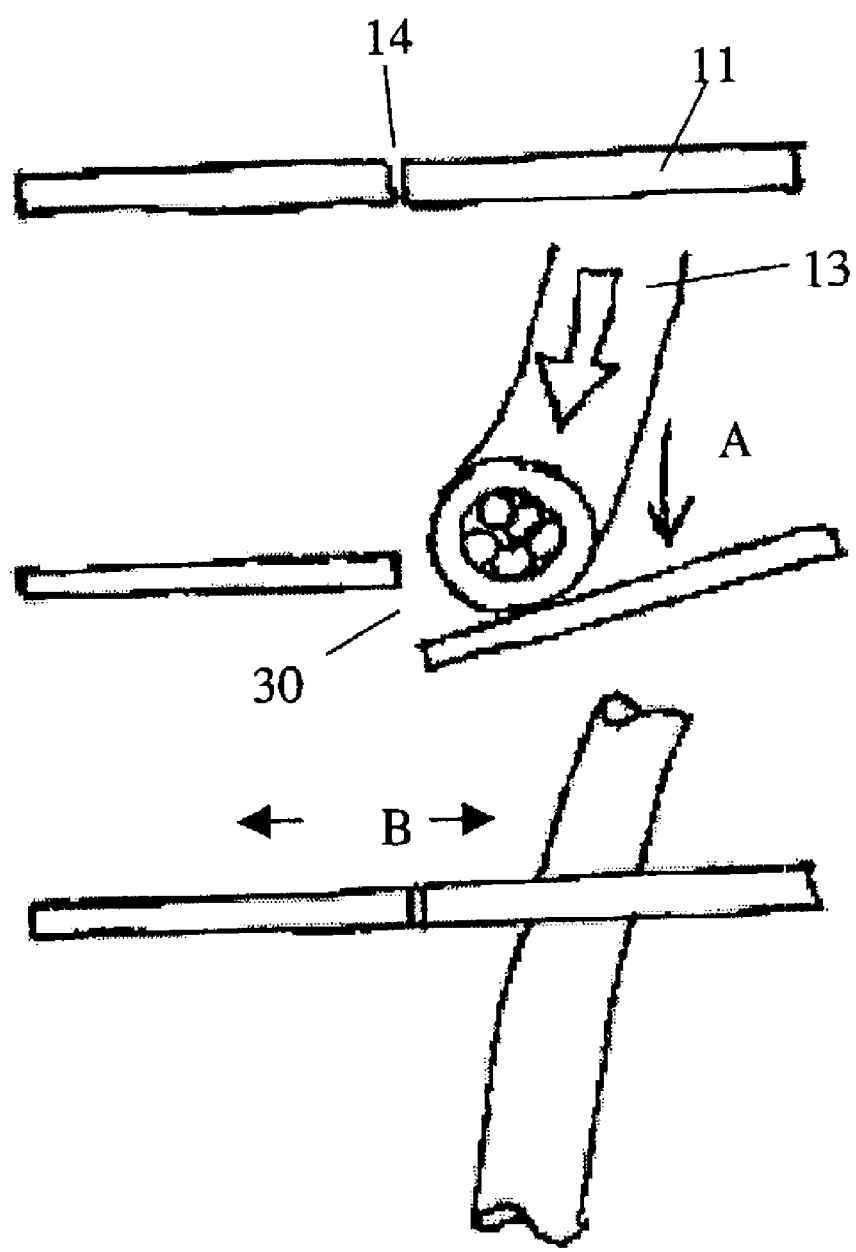
FIG. 3: illustrates the opening and closing action of an embodiment of a cable-securing device.

In contrast, when a user twists the free washer ends adjacent the split as shown by the letter B in FIG. 3, the split is very easily opened and cables added or removed.

In its natural state, the device assumes a closed position and it is unlikely that a cable bundle would deform the device in the particular way which would result in the split opening (and releasing the cable bundle). Accidental release of a cable would require the washer and cable bundle to be twisted at an acute angel with respect to one another.

The attachment means 12 is ideally resilient and in the form of a clip having an open jaw section 17 shaped and dimensioned so that it can be engaged with a suitably shaped mounting point by means of a snap action. Moulding from a plastic material would provide the required range of resistance and resilience.

In the embodiment shown, the clip 12 is shaped so that it resiliently engages with an elongate part 20 of a mounting means (not shown in its entirety).

The clip 12 is shaped and dimensioned so as to engage by a snap fit with the mounting point. This is aided, in the present preferred example, by the presence of adjacent lips 16 which help the user ease the clip over the engagement surface of the mounting means.

As can be seen from the figures, the clip 12 is in the shape of a hollow cylinder having a lengthwise portion 17 removed to form an open jaw section. Other geometries may be possible depending on the variability in shape of the potential mounting points.

For example the clip 12 may be shaped to accommodate a square, or irregular mounting point and thus have an inner surface itself shaped to engage the mounting point effectively.

Although primarily aimed at mounting cables to table legs or other similar mounting means, in an alternative embodiment, the device may be adapted to secure cables to a surface such as wall. In this case, the clip 12 may be replaced with a flat panel part (not shown) with screw holes or similar fixing means.

The embodiment shown in the figures may also be used to secure a cable or cable bundle to another cable. While this function may sound slightly contradictory, it is possible that the clip 12 may be shaped so that it can firmly attach to, for example, a flexible power cable itself. In this way a bundle of cables may itself be secured to another cable, thereby providing a routing and tidying function. In this case the effectiveness of the clip would depend on the rigidity of the material from which it is formed.

The cable enclosure 11 as shown in FIG. 1 is mounted on the cylindrical ring clip 12 so that the one or more cables constrained within the enclosure are aligned substantially parallel with the lengthwise axis of the ring clip. Other orientations are possible including the possibility that in a more complicated construction the ring 11 may be rotated or moved with respect to the mounting clip 12.

In use, depending on the specific geometry of the clip 12, the user snaps one or more of the cable-securing devices 10 onto a sequence of rigid mounting locations 20 such as points along a table leg, computer part or similar. The cables are then gathered singly or in a bundle and each of the devices 10 twisted to open the split 14. The cable or cable bundle is slipped into the enclosure 15 and the ring released. The split closes effectively trapping the cables therein.

If the cables are displaced sideways, the ring resists bending as this action pushes in the direction of the plane of the washer, a direction which has considerable rigidity. However, cables may be easily removed or added by twisting the washer in the direction normal to the plane of the washer as in this direction, the washer has relatively little rigidity.

Modifications and variations in the construction of the device are envisaged within the scope of this function of the invention. For example, the particular shape and dimensions of the device may be adapted to suit the particular anticipated cabling context. Variations include forming the washer in a different shape, while preserving the deformation characteristics of trapping cables therein, but allowing insertion/extraction as described above.

As noted above, in some applications the invention may be adapted so that the device can be mounted on other mounting means. Examples of such modifications include more mechanical mounting techniques such as screws, plug-like fittings, gluing surfaces or similar. It is also possible that in some applications the attachment means might be omitted and the enclosing properties of the washer alone be used to constrain the cable mass. Although not providing a complete solution, this embodiment may nevertheless be used for tidying cables bundles either as an alternative or in conjunction with devices having attachment means.

Given that the device 10 can be moulded from plastic and the design is easily adaptable to different cabling contexts, the invention provides a cheap and highly effective way of tidying and organising cables. Cables can be routed very quickly without tools or additional parts. Similarly, cables can be removed very quickly for reconfiguration or for peripheral removal.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

What is claimed is:

1. A cable-securing device including:
    an attachment means adapted to be attached to a mounting point; and
    a cable enclosure mounted on the attachment means, the enclosure adapted so that one or more cables can be removably constrained therein,
    wherein the cable enclosure is formed in the shape of a resilient flat washer having a substantially radial cut or split thereby allowing the washer to deform in a direction substantially perpendicular to the plane of the washer while being rigid in a direction in the plane of the washer thereby allowing cables to be inserted or removed from within the washer when the washer is twisted and the split opened, but constraining the cables within the washer when the washer is flat and the split is closed.

2. A cable-securing device as claimed in claim 1 wherein the mounting point is in the form of a flat or otherwise shaped part adapted for gluing to a flat surface; a flat part incorporating screw holes for mounting to a corresponding surface; a snap plug adapted to engage with a hole in a mounting surface or similar engagement means adapted to be engaged with a correspondingly shaped mounting means.

3. A cable-securing device including:
    an attachment means adapted to be attached to a mounting point; and
    a cable enclosure mounted on the attachment means, the enclosure adapted so that one or more cables can be removably constrained therein,
    wherein the attachment means is resilient and in the form of a clip having an open jaw section shaped and dimensioned so that it can be engaged with a suitably shaped mounting point by means of a snap action,
    wherein the cable enclosure is formed in the shape of a resilient flat washer and is configured to deform in a direction substantially perpendicular to the plane of the washer while being rigid in a direction in the plane of the washer.

4. A cable-securing device as claimed in claim 3 wherein the clip is shaped so that it resiliently engages with an elongate part of a mounting means.

5. A cable-securing device as claimed in claim 4 wherein the clip is shaped and dimensioned so as to engage by a snap fit with the mounting point.

6. A cable-securing device as claimed in claim 3 wherein the clip is adapted so that it can engage with a flexible power supply cable in a resilient snap action.

7. A cable-securing device as claimed in claim 3 wherein the clip is adapted so that it engages with a rigid mounting means.

8. A cable-securing device including:
    an attachment means adapted to be attached to a mounting point; and
    a cable enclosure mounted on the attachment means, the enclosure adapted so that one or more cables can be removably constrained therein,
    wherein the attachment means is resilient and in the form of a clip having an open jaw section shaped and dimensioned so that it can be engaged with a suitably shaped mounting point by means of a snap action,
    wherein the cable enclosure is formed in the shape of a resilient flat washer and is configured to deform in a direction substantially perpendicular to the plane of the washer while being rigid in a direction in the plane of the washer, and
    wherein the clip is in the shape of a hollow cylinder having a lengthwise portion removed to form an open jaw section thereby allowing the clip to be engaged with a similarly shaped mounting means section.

9. A cable-securing device as claimed in claim 8 wherein the cable enclosure is mounted on the clip so that the one or more cables constrained within the enclosure are aligned substantially parallel with the lengthwise axis of the clip, wherein the clip is a cylindrical ring clip.

10. A cable gathering device comprising:
    a devise formed in the shape of a resilient flat washer having a substantially radial cut or split thereby allowing the washer to deform in a direction substantially perpendicular to the plane of the washer while being rigid in a direction in the plane of the washer,
    wherein a normal position of the washer is a flat, closed split position, and
    wherein the resilience of a flat portion of the washer is high compared to the resilience of the flat portion when twisted.

11. The cable gathering device as claimed in claim 10, wherein the cable gathering device is composed of a plastic.

* * * * *